Dec. 30, 1930.   A. F. SPITZGLASS   1,787,176
HEAT REGULATOR AND RECORDER
Filed Jan. 10, 1927   2 Sheets-Sheet 1

INVENTOR.
ALBERT F. SPITZGLASS
By Cheever + Cox ATTYS.

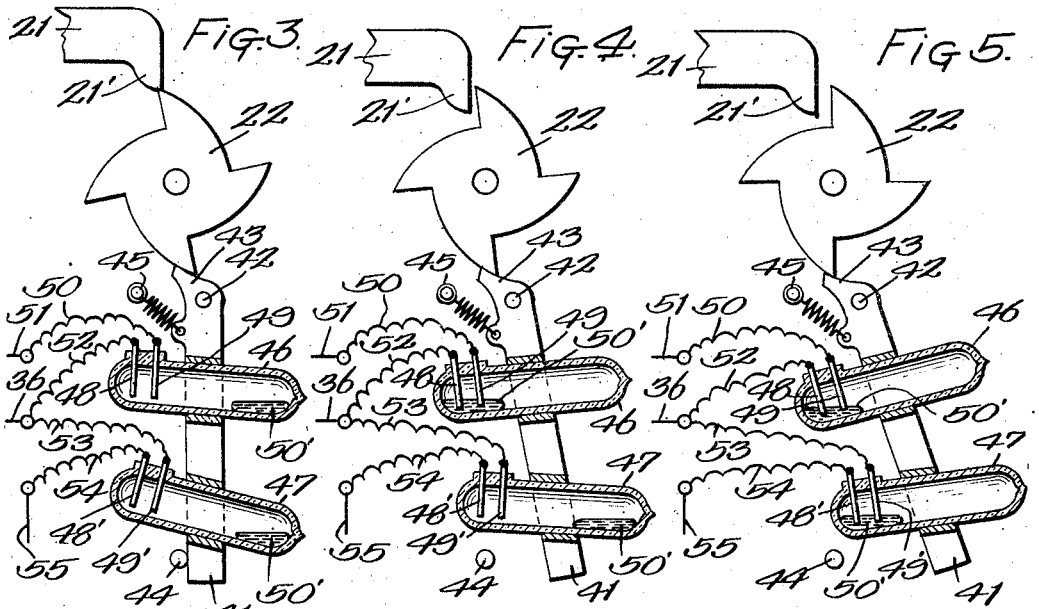
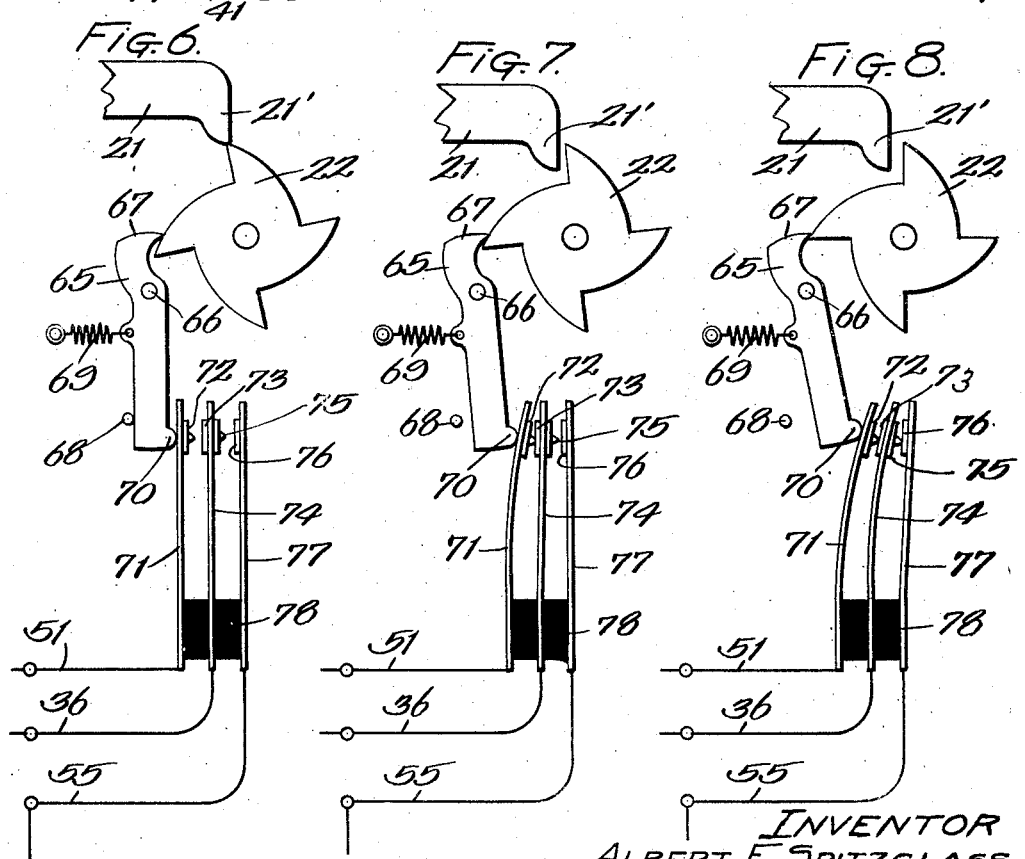

Patented Dec. 30, 1930

1,787,176

UNITED STATES PATENT OFFICE

ALBERT F. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS

HEAT REGULATOR AND RECORDER

Application filed January 10, 1927. Serial No. 160,155.

My invention relates to heat regulators and recorders for regulating the temperature of ovens and the like. The invention is especially useful where high temperatures are to be dealt with and I have chosen to illustrate the principle of the invention in connection with a recording pyrometer in which a galvanometer pointer is controlled by means of a thermocouple. Recording pyrometers are known in which a periodically operating depressor presses a pointer against a recording sheet for marking the latter and producing a visible record of the fluctuations of temperature. In the apparatus illustrated the depressor is equipped with a regulating switch which controls a main switch by means of which the heat is turned on or off in the enclosure whose temperature is to be controlled. The general object of the invention is to provide apparatus which may be controlled by the very sensitive and delicate pointer commonly employed in a recording pyrometer. Contributory to this general object it is my purpose to provide means which will at definite and recurring intervals require the apparatus to determine whether the heat shall be started, continued or discontinued. In other words, in my apparatus the controlling elements are called upon periodically to make a choice, so to speak, as to whether the heat shall be turned on, turned off, or be maintained in status quo. A further object is to provide apparatus which shall be capable of functioning properly for an indefinite period despite the fact that a very light and delicate relay switch is employed. Ancillary to this last mentioned object it is my purpose to provide a construction in which the regulating switch will be closed prior to the closing of a periodically operating auxiliary switch which is in series with it, thus requiring the auxiliary switch to finally complete the circuit, thus avoiding arcing at the regulating switch. A further object is to provide a construction in which the status of the heater shall not be changed, regardless of the fact that parts of the apparatus act periodically, unless the conditions of the chamber under observation require a change.

These and other objects will become apparent as the description proceeds.

In the accompanying drawings

Figures 3, 4 and 5 are views of the periodically controlled regulating switch and of the anti-arcing switches, showing their successively operating positions.

Figures 6, 7 and 8 are corresponding views of a modified form of anti-arcing switches.

Figure 2:
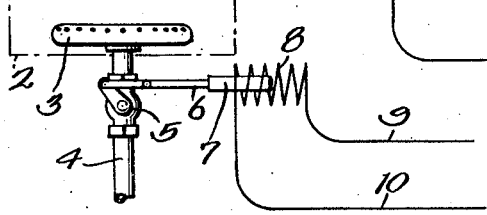
Figure 2 shows an alternative form of the heating means, which may be used as a substitute for that shown in Figure 1.

Referring now to the drawings, my invention comprises a heating means 1 which in the preferred form is an electrically heated resistance element positioned in an enclosure 2 diagrammatically illustrated by the dot and dash lines. This enclosure may take any desired form such as a chamber, chimney, fire pot, room or in fact any enclosure wherein it is desired to control the temperature and/or to record the changes of temperature. In Figure 2 a modified form of heating means is disclosed as a fuel burner 3 having the fuel supply pipe 4 connected thereto and controlled by a suitable valve 5 operated by a rod 6 in turn provided with a core 7 operated by an electrical solenoid coil 8. The heating coil 1 or its equivalent shown in Figure 2 is adapted to be controlled by means of a main heating circuit comprising the wires 9 and 10 which connect respectively to the main power circuit wires 11 and 12 leading from a suitable source of electrical power 13. A main switch 14, suitably operated, is disposed in the main heating circuit to control its operation. The operation and control of this main switch 14 will be hereinafter described. The main heating circuit also includes the usual hand switch 15'. When the main switch 14 is closed the heating coil 1 is energized by the source of power 13, or in the alternative form in Figure 2 the solenoid coil 8 is energized to govern the opening of the fuel valve 5.

Associated with the heating means within the enclosure 2 I provide means governed by changes of condition within this enclosure for automatically controlling the main switch 14 for governing its action. The preferred form of such means comprises a thermocouple 14' adapted to be affected in the usual manner by variations of temperature within the enclosure. This thermocouple is operatively associated with a device comprising an arm or member shiftable in accordance with the variations in movement of the thermocouple 14', which arm in turn is also actuated by a periodically operating regulating mechanism governing the main switch of the heating circuit whereby to determine at definite, recurring intervals whether or not the heating means shall start, stop, continue in operation or alter its operation in accordance with the action of the thermocouple. In the form of my invention illustrated, the thermocouple 14' is operatively associated with a recording pyrometer comprising the usual galvanometer 15 connected to the thermocouple by means of the wires 16 and 17. This galvanometer includes the usual very sensitive and delicate pointer 18 which shifts back and forth in a horizontal plane in accordance with the operation of thermocouple 14'. As is well known, this pointer 18 is adapted to move over the usual straight edge 19 which receives the recording sheet 20 which may be provided with carbon paper or the like for making a permanent record when the pointer 18 is contacted with the sheet. The means for shifting this sheet as desired is not illustrated since it is well known in the pyrometer art.

The pyrometer also includes the usual depressor bar 21 for contacting the pointer 18 with the traveling sheet 20. In the form illustrated this bar 21 is pivotally mounted as at 22' on brackets 23' so that the bar is free to rise and fall in a substantially vertical plane. Means are provided for periodically operating this depressor bar to record the temperature changes as above indicated. This means comprises the star wheel 22 which is rotated at a constant speed from a suitable source of power, preferably that of the main power circuit. In the drawings I have indicated this rotation of the star wheel 22 rather diagrammatically as being rotated by a motor 23 connected to the main circuit generator 13 by means of wires 24 and 25. This circuit also includes the usual hand switch.

Associated with the periodically actuated depressor bar 21 is periodically operated switch mechanism for energizing or deenergizing a solenoid for controlling the main switch by means of which the heat is turned on or off in the enclosure 2. This periodically operating switch mechanism includes a master element operatively governed in its rise and fall with the depressor bar by means of predetermined movements of the pointer 18 for determining whether the heating means shall be continued or discontinued. The periodically operated switch mechanism is associated with a solenoid governing the main switch of the heating circuit. Main switch 14 is mounted on a block of insulation 26 carried by rod 27 so as to be capable of vertical movement through brackets 28, and this rod is held by a coil spring 29 in downward position so that the contact on the main switch 14 is broken from the adjacent terminal of the wire 9. The upper portion of rod 27 is provided with an enlarged head 30 which directly underlies a core 31 of the solenoid coil 32. In addition the insulation block 26 carries an oppositely extending contact 33 which is connected by means of wire 34 to the main circuit wire 11. The lower end of the solenoid coil is connected as at 35 with a contact 36' disposed opposite the contact 33 and this lower portion of the coil also connects by means of wire 36 to the switch mechanism about to be described. The upper portion of the solenoid coil 32 connects through a wire 37 and protective resistance 38 to wire 39 in electrical connection with the main circuit wire 12. In addition the upper portion of the solenoid coil 32 connects by means of a wire 40 to the regulator switch hereinafter described.

A portion of the periodically operating switch mechanism is operated directly by the rotation of the star wheel 22. This switch mechanism is shown in detail in Figures 3, 4 and 5 in its successive positions of operation. This switch mechanism comprises a pivotally mounted arm 41 pivoted as at 42 and provided on its upper end with a nose 43 adapted to make operative contact with the star wheel 22. This arm 41 is normally maintained against an abutment 44 by means of coil spring 45. This position is illustrated in Figure 3 of the drawings. The arm is provided with two bores in which are mounted a pair of switch members 46, 47 in vertically superimposed relation. These switch members are alike in construction except that they are mounted at varying angles with respect to the member 41. Each switch element comprises a tubular container of suitable insulating material, such for instance as glass, provided at its upper left hand side with a slight enlargement for receiving in spaced apart relation two electrical contacts 48, 49 and 48', 49'. Each container is adapted to receive a small quantity of mercury 50' which is adapted to flow back and forth as indicated in Figures 3 to 5 when the member 41 is swung, to make and break the electrical circuit through these contacts. The electrical contact 49 is connected by means of a wire 50 to a wire 51 running to the regulator switch hereinafter described. The other contact 48 is connected by means of a wire 52 to the wire 36 running to the bottom portion of the solenoid coil 32. The contact 49' of the lower switch 47 connects by means of the wire 53 to wire 52 and also to wire 36, and the contact 48' of switch 47 connects by means of wire 54 to a wire 55 joining the wire 34 which connects with the main circuit wire 11.

Figure 1:
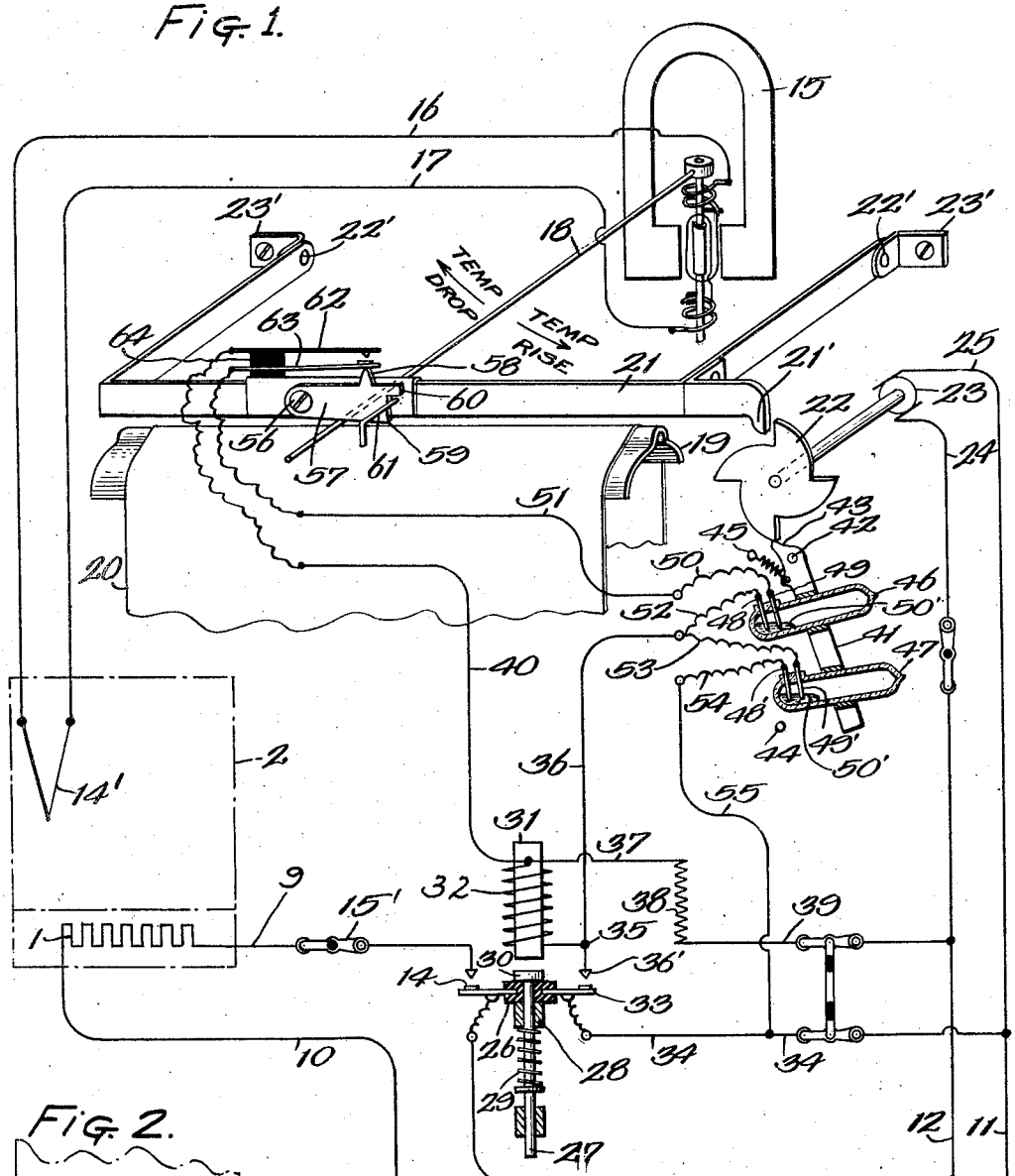
Figure 1 illustrates a somewhat diagrammatic view of one embodiment of my invention, with certain of the pyrometer constructions shown in perspective.

The regulating switch member of the periodically operated switch mechanism is preferably mounted on the depressor bar 21 to be operated thereby. In the construction illustrated the bar 21 has pivotally mounted thereon, as at 56, a master element 57. This master element is provided on its upper side with an upstanding lug 58 and the lower side of the master element is provided with a downwardly inclined edge 59 which tapers from the inner pivotal end as at 56 to its outer edge so that when the master element 57 is in substantially horizontal position its outer lower edge will be nearer to the straight edge than the inner portion of its lower edge. The outer end of the master element is provided with an outwardly projecting lug 60 which is adapted to overlie a stop 61 for limiting the downward movement of the master element and hence the relation of the wedge-like lower edge to the upper portion of the straight edge. This master element is located immediately over the pointer 18 of the galvanometer 15, and the length of the inclined lower portion of this master element is sufficient to cover the variation in movement of the pointer 18 in its horizontal plane of operation. The upstanding lug 58 of the master element is arranged to actuate the regulator switch. This switch comprises the two normally open contact arms 62 and 63 which are carried by an insulation block 64 mounted on the depressor bar 21. When the master element is raised the contact points on the leaf springs 62 and 63 will be brought together to complete the circuit through the regulator switch. When the depressor bar 21 drops during the actuation of the star wheel 22 the lower inclined edge of the master element which is carried by the depressor bar will contact the pointer or arms 18 and thereby press it into engagement with the flexible sheet lying over the straight edge 19, and since this straight edge is a substantially unyielding surface if the pointer 18 be sufficiently far to the right, as viewed in Figure 1, the downward inclination of the lower edge of the master element will be of sufficient height vertically to cause the master element to swing upwardly about its pivot and cause the lug 58 to move the contacts 62 and 63 into engagement, thereby to complete the circuit through the regulating switch. This corresponds to the temperature rise position of the pointer 18. On the other hand, if the temperature drops the pointer 18 will move to the left, and if it moves sufficiently far when the depressor bar 21 is dropped, as heretofore described, the master element will not be swung upward sufficiently far to cause the contacts 62, 63 to engage.

A complete understanding of my invention will be readily understood from a description of its operation. Starting with the heating coil 1 cold, current will flow from the main power line 12 through the wire 39, through protective resistance 38, wire 37, to the upper part of the solenoid coil 32, thence through the coil to the point 35, thence through wire 36, and if the auxiliary switch mechanism which is being periodically operated by means of the main power circuit through the wires 24, 25 be in the position shown in Figure 3 of the drawings wherein both of the switch contacts are broken, the main heating circuit will still be broken at the main switch 14. However, when the periodically operating switch mechanism next operates, it will come to a position such as illustrated in Figure 4 wherein the upper switch contacts 48 and 49 are connected, but the main heating circuit still remains broken because no circuit is established through the solenoid coil 32. However, the arm 41 is almost immediately thereafter positioned as shown in Figure 5 wherein both the contacts 48, 49 and 48', 49' are made. In this position the current will flow from the wire 36 through the wire 53 to contact 49' to contact 48' to wires 54, 55, 34 and back to main circuit line 11, thereby completing the circuit through the coil 32 and drawing the head 30 of the main switch 14 upwardly to close the main switch through the main heating circuit. At the same time the contacts 33 and 36' are made, thereby establishing the current so that it can flow from the main line 12 through wires 39, 38, 37 through solenoid coil 32 across the contacts 36' and 33 to wire 34 and back to main line 11, thereby permanently holding the solenoid energized from the main line irrespective of the operation of periodically operating switches 46 and 47. Thus with the solenoid 32 held in energized position the main switch 14 will be closed and the heating circuit will be in operation to heat the enclosures 2, and this condition will persist as long as the thermo-couple 14 is not sufficiently affected to cause a change and despite the breaking of the circuits at the contacts 48, 49 and 48', 49' of the switches 46 and 47.

During the successive movements of the star wheel 22 the depressor bar 21 is being raised and lowered to depress the pointer 18 and thereby permanently record the temperatures indicated by the fluctuating pointer 18 as it shifts in accordance with the action of the thermo-couple.

If the temperature in enclosure 2 becomes sufficiently hot the thermo-couple will cause the pointer 18 to move to the right, and when in this position, when the periodically operated star wheel 22 permits the nose 21' of the depressor bar to drop off, the instant this occurs, the lower inclined edge of the master element 57 will cause the pointer 18 to contact with the recording paper 20 and straight edge 19, and the reactive effort will cause the master element to shift upwardly about its pivot 56 thereby causing the lug 58 to close the circuit through contacts 62 and 63 of the regulator switch. At this instant the auxiliary switches 46 and 47 will be in a position which is intermediate that shown in Figures 3 and 4 of the drawing. In other words, as soon as the nose 21' of the depressor bar drops off the star wheel 22 the regulator switch contacts 62, 63 will be closed. However, the switch member 41 will not have moved sufficiently far toward the right at this instant to have caused the mercury in the upper switch tube 46 to have moved to the left. But just thereafter, the switch member 41 will continue its pivotal movement to the right and will thereby cause the mercury in the upper tube to electrically connect the upper contacts 48 and 49, thereby causing current to flow from the main line 12 through wires 39, 38, 37, 40 across contacts 62, 63 through wires 51, 50, contacts 48, 49, wire 52, thence through wire 36 and through switch contacts 36' and 33 to wire 34, back to main circuit line 11. This connection at once short-circuits the solenoid coil 32 and thereby permits the coil spring 29 to immediately open the main switch 14, thereby breaking the main heating circuit. It will also be noticed that simultaneously therewith the contacts 33 and 36' are also broken. However, immediately subsequent to the making of the contacts 48 and 49 by means of the mercury 50' in the upper tube the switch member 41 will have moved far enough toward the right to permit the mercury 50 in the lower switch tube 47 to connect contacts 48' and 49' so that current will flow from the main line 12 through the wires 39, 38, 37, 40 through regulator switch contacts 62, 63, wires 51, 50, contacts 48, 49, wires 52, 53, contacts 49', 48', wires 54, 55 to wire 34 back to main line 11. Particular attention is directed to the fact that the contacts 62, 63 of the regulator switch are made before the contacts 48 and 49 of the upper tube 46 are interconnected by means of the mercury 50'. This prevents arcing at the delicate platinum contacts 62, 63 of the regulator switch when the circuit is made therethrough. In other words, when the regulator switch contacts engage, the upper switch 46 not only assists in de-energizing or short-circuiting the solenoid coil 32 but it also functions as an anti-sparking switch for the regulating switch.

With the main heating circuit switch 14 in open position, when the arm 41 is next moved by the periodically operated star wheel 22 the auxiliary switch arm will swing back to the position shown in Figure 3, but as it does this it will pass through the intermediate position shown in Figure 4. As arm 41 starts its reverse swing to the left the regulating switch contacts 62, 63 will still be in closed position since the nose 21' of the depressor bar has not been raised by high point of the star wheel as shown in Figure 5. In the swing of the switch 41 to the left the mercury 50' in the lower switch will first break contact between the contacts 48' and 49', thereby breaking the circuit at this point so that when the arm 41 will have swung completely to the left as shown in Figure 3, at which time the mercury in the upper switch tube 46 also breaks contact, the circuit through the still closed contacts 62, 63 will be completely open so that when these contacts are broken by the extreme raising of the depressor bar 21 no arcing can possibly take place; hence these auxiliary switch members 46, 47 and particularly 47 also constitute anti-arcing switches for the opening of the regulator switch contacts 62 and 63.

It must be evident from an inspection of the drawings that as long as the pointer 18 remains to the right, with the high temperature in the enclosure 2, the periodically operating switch mechanism can continue to operate without energizing the solenoid 32 since at each operation the regulator switch contacts 62, 63 will be closed to permit the solenoid to be short-circuited. However, as soon as the pointer 18 moves toward the left in accordance with the action of the thermo-couple 14' the regulator switch contacts 62, 63 will be broken, and the current flowing from the main lines 11 and 12 will then be free to energize the solenoid 32 to close the main switch 14 of the heating circuit.

From an inspection of Figures 6, 7 and 8 of the drawings it will be obvious that my invention is not limited to the specific details of construction of the periodically operated auxiliary switch construction shown in Figures 3 to 5 of the drawings since other types of switches for accomplishing their purpose may be substituted. For instance, the construction shown in Figures 6, 7 and 8 may be used. In this construction the star wheel 22 is shown as cooperatively associated with the toe 21' of the depressor bar 21 and also in position to operate the switch bar 65 pivoted as at 66 and having a nose 67 adapted to engage the star wheel 22. As in my preceding construction the lower end of the switch bar 65 is normally pressed against a stop 68 by means of a coil spring 69. The lower portion of this switch bar 65 is provided with a nose 70 adapted to engage a leaf spring 71 provided on its outer end with a contact 72 which in turn is adapted to engage a cooperative contact 73 on a leaf spring 74 spaced from the leaf spring 71.

The opposite face of the leaf spring 74 is provided with an additional contact 75 which in turn is adapted to engage another contact 76 mounted on a third leaf spring 77. The leaf springs 71, 74 and 77 are maintained in normal spaced-apart relation by the insulation 78. The bottom portions of the leaf springs 71, 74 and 78 are provided with suitable wiring so that they can be inserted in the circuit illustrated in Figure 1 of the drawings. The sequence of operation is plainly illustrated in the successive Figures 6, 7 and 8, and corresponds exactly to the successive operations shown in Figures 3, 4 and 5 of the drawings.

It must be evident that in controlling the main switch of the main heating circuit by means of periodically operating switch mechanism I do not intend to limit myself to the use of a recording pyrometer since any type of periodically operating mechanism for operating the switch parts is possible. However, the use of the pointer of a recording pyrometer for accomplishing this function whereby the pyrometer not only keeps an accurate record of the temperature variations in the enclosure tube but also provides a novel and highly satisfactory means for periodically operating the switch mechanisms for controlling the main heating circuit is highly desirable.

From the foregoing description it is readily appreciated that my improved device presents a most simple and advantageous mechanism for controlling the temperature or other condition within an enclosure or chamber. By merely closing the hand switch in the main power circuit, the periodically actuated switch mechanism is automatically thrown into action to start the operation of the heating circuit; thereafter at predetermined, recurring periods the heater is thrown off or continued, or thrown on, in accordance with the dictates of the thermo-couple. It is also apparent that this operation may be accompanied by the simultaneous recording of the temperature by the pyrometer; or the usual paper sheet may be omitted, the depressor bar, by reason of its cooperation with the pointer and straight edge, functioning properly to actuate the switch elements. Furthermore by suitably altering the speed of rotation of the star wheel 22 through a suitable control for the motor or otherwise, the periodicity of actuation of the switch arm 41 may be varied to control the time interval between changes of a rise and fall in temperature since the heating coil will be on or off a shorter or longer interval.

By employing a sloping edge on the rocker arm or master element 57 there is no appreciable tendency of said arm to shift the pointer laterally when it engages it. If the active edge, instead of being sloping or differentially graduated, consisted of one or more steps there would be times when a shoulder of one of the steps would strike the corner and deflect it from its true position. This error is avoided by employing the differentially graduated construction shown.

My invention possesses further important advantages in that the very delicate galvanometer pointer 18 is adapted to extremely fine variations in temperature fluctuations and these shifting movements of the pointer are instantly transmitted to the switches themselves by the cooperation of the reactive effort between the pointer and the unyielding straight edge. These latter elements while of rugged construction are yet of certain operation. It is manifest that I am not limited to the described construction and arrangement of the master element and its cooperating structure as various other mechanisms for use in this connection are within the scope of my invention.

It is also clear that many other changes may be made in the details and construction of the various parts of this apparatus without departing from the spirit of my invention.

Having thus described my invention what I claim as new and desire to secure by Letters Patent is:

1. In a means for controlling the temperature in an enclosure including an electrically operable heating element, a pyrometer having an arm movable in accordance with the temperature within said enclosure, a bar periodically movable toward and from said arm, and means including a periodically operating part and another part located on the bar and cooperable with said arm for controlling said heating element in accordance with the position of the arm at the moment when the bar moves toward it, said bar and first named part operating in cycles in timed relation to each other.

2. In a means for controlling the temperature in an enclosure having a heating element, a recording pyrometer having an arm movable in accordance with the temperature within said enclosure and a depresser periodically movable toward and from said arm to cause the arm to record its various positions thereof, and means including a periodically operable part and a second part located on the depressor and cooperable with said arm for controlling said heating element in accordance with the position of the arm at the moment when the depressor moves toward it, the periodicity of the depressor and first named part being in timed relation.

3. In a means for controlling the temperature in an enclosure, including an electrically operable heating element, a pyrometer having an arm movable in accordance with the temperature in said enclosure, a bar periodically movable toward and from said arm, and means for controlling said heating element including a periodically operable switch and a second switch located on the bar and adapted to be actuated by said arm when the latter is in one position at the moment when the bar moves towards said arm and uninfluenced by said arm when the latter is in another position at the moment when the bar moves towards said arm, the periodicity of the bar and first named switch being such that the two switches are in closed position at the same time.

4. In a means for controlling the temperature in an enclosure, including an electrically operable heating element provided with a control circuit, a magnetically operated main switch for controlling the control circuit thereof, an arm movable in accordance with the temperature within said enclosure, a bar movable toward and from said arm, and an oscillating switch and a regulating switch for controlling the main switch, said regulating switch being carried by said bar and actuatable by the arm when the latter is in one position and being uninfluenced by the arm when the arm is in another position and said oscillating switch operating in timed relation to the arm whereby both switches are in closed position at the same time.

5. In a means for controlling the temperature of a chamber including an electrically operable heating element, a magnetically operated main switch for controlling said heating element, a regulating switch for controlling the operation of the main switch, a pyrometer having an arm movable in accordance with the temperature of the chamber, and a pawl for operating the regulating switch, said pawl being periodically movable to and from said arm and actuatable by engagement therewith.

6. In a means for controlling the temperature of an enclosure including an electrically operable heating element, a normally open main switch which when closed causes the heating element to operate, an electro magnet which when energized closes the main switch, a pyrometer having an arm movable in accordance with the temperature in the enclosure, and a regulating switch for short-circuiting said electro-magnet to thereby cause the main switch to open and render the heating element inoperative and means for operating said switch including a pawl adapted to cooperate with the arm to close the regulating switch when the arm is in a position corresponding to excessive temperature.

7. In a means for controlling the temperature in an enclosure including an electrically controlled heating element, an arm movable in accordance with the temperature within said enclosure, a regulating switch for regulating the supply of electric energy to said heating element, the operation of said regulating switch being controlled by the position of said arm, an anti-arcing switch in series with said regulating switch, and a common means for actuating said switches, said means being arranged to actuate said antiarcing switch subsequent to the actuation of said regulating switch to prevent arcing, thereat.

8. In a means for controlling the temperature in an enclosure including an electrically operated heating element for said enclosure, a pyrometer having a pointer movable in a plane in accordance with the temperature in said enclosure, an electro-magnetic switch for controlling the operation of said heating element, a regulating and an anti-arcing switch in series with each other for jointly controlling the said electro-magnetic switch, a reciprocating master element removably engaging the pointer when the latter is in one position and clearing it when it is in another position, the regulator switch being actuated by said master element when the latter engages the pointer, and mechanism for periodically closing the anti-arcing switch and simultaneously causing the master element to reciprocate, said mechanism being timed to cause the opening of the regulating switch after the opening of the anti-arcing switch.

9. A control instrument for a controllable device comprising an electric contact devise for controlling the operating circuit of said controllable device, a mercury switch in series with said contact device, a movable element whose position varies according to the condition of the controllable device, and automatic means for periodically actuating said contact device and said mercury switch, said means being timed to operate the mercury switch in advance of the actuation of the contact device, for preventing arcing at the latter.

10. In combination, a main electrical circuit including a heating means and a main switch, a pyrometer including a thermocouple influenced by said heating means, and arranged for recording the temperature changes thereof, a solenoid for actuating said main switch to make and break the main circuit, and secondary switches actuated by said pyrometer for energizing and short circuiting said solenoid for actuating the main switch.

11. A control instrument having a controlling device and means for operating it, said means including a control circuit, a swinging pointer pivoted at one end and movable in accordance with the condition of the apparatus to be controlled, and an electric switch mechanism for controlling the said control circuit, said electric contact mechanism having a switch operating rocker arm provided with a sloping edge engageable with said pointer operable to operate said contact mechanism in accordance with the position of said pointer.

12. A control instrument comprising a control device, an operating circuit for said control device, said circuit including a circuit making contact, and an antiarcing switch in series with said circuit making contact, means for operably actuating said antiarcing switch and said circuit making contact, and means controlled by the condition of the apparatus being controlled for rendering said circuit making contact inoperative.

13. A control instrument for a controllable apparatus comprising a control device, an operating circuit for said control device, said circuit including a circuit making contact and an antiarcing switch in series with said contact, means for operably actuating said switch and said contact, and means including a movable element, the position of which varies according to the condition of the controllable apparatus, adapted to control the operation of said contact.

14. In combination, means for heating an enclosure comprising a heating element and shiftable means for controlling the heating of said element, a device responsive to the temperature of the enclosure and including a movable member, cyclically operating means for controlling the shiftable means to increase the temperature of the enclosure and operable independently of the movable member, and means co-acting with the cyclically operating means and controlled by the movable member upon attainment of a predetermined temperature for controlling the shiftable means for decreasing the temperature of the enclosure.

15. The combination with a heating means, and control mechanism therefor adapted to exert one or another of two effects on said means of a temperature responsive device including a movable index, means periodically operated for causing said mechanism to exert one effect in said heating means and operable independent of the position of the index, and a second control means for causing said control mechanism to exert another effect in said heating means and controlled in its operation by the position of said index.

16. In combination, a heating means and a solenoid operated control therefor, a pyrometer responsive to the temparture of said means, an electric circuit including said solenoid and a periodically operated switch for energizing said solenoid to control the heating of said means, and a second circuit closer in series with said switch and operable by the pyrometer upon attainment of a predetermined temperature for co-acting with said switch for de-energizing said solenoid.

17. The combination with a heating means and a solenoid operated control therefor, of a device responsive to said heating means and including a movable index, a periodically operated circuit closer in series with said control and operable independently of the responsive device for energizing said solenoid to increase the temperature of the heating means, a normally open circuit closer in shunt with the solenoid and in series with the periodically operated circuit closer operable by the responsive device upon attainment of a predetermined temperature and co-acting with the first circuit closer for shorting the solenoid to decrease the temperature of the heating means.

18. In combination, an electric circuit including a heating means, a device having a movable index and responsive to the temperature of said means, and electrical devices associated with circuit, one of said devices actuated periodically and independently of said other devices for controlling the heating means one way and another of said devices actuated by said index in certain positions thereof and coacting with said first device for controlling the heating means in the opposite direction.

19. In a control system, an electrical circuit including a heating means and a main switch, a pyrometer responsive to the heating means and arranged for recording the temperature variations thereof, a solenoid for actuating said main switch to make and break the circuit to the heating means, a pair of switches, one of which is in series with the solenoid, means for periodically opening and closing said switches in succession for energizing said solenoid to increase the temperature of said heating means, a regulating switch in shunt with the solenoid and in series with said pair of switches adapted to be closed by the pyrometer upon attainment of a predetermined temperature and coacting with said pair of switches to de-energize the solenoid to decrease the temperature of the heating means, said pair of switches and regulating switch being closed in succession in the order named and being opened in the reverse order.

In witness whereof, I have hereunto subscribed my name.

ALBERT F. SPITZGLASS.